United States Patent
Wentworth

(10) Patent No.: US 10,640,699 B2
(45) Date of Patent: May 5, 2020

(54) TREATMENT OF CIRCULATING WATER SYSTEMS INCLUDING WELL TREATMENT FLUIDS FOR OIL AND GAS APPLICATIONS

(71) Applicant: BWA WATER ADDITIVES UK LIMITED, Greater Manchester (GB)

(72) Inventor: Christy Colleen Wentworth, Jasper, GA (US)

(73) Assignee: ITALMATCH CHEMICALS GB LIMITED, Manchester (GB)

( * ) Notice: Subject to any disclaimer, the term of this patent is extended or adjusted under 35 U.S.C. 154(b) by 0 days.

(21) Appl. No.: 16/150,406

(22) Filed: Oct. 3, 2018

(65) Prior Publication Data

US 2019/0100691 A1 Apr. 4, 2019

Related U.S. Application Data

(60) Provisional application No. 62/567,320, filed on Oct. 3, 2017.

(51) Int. Cl.
| | | |
|---|---|---|
| *C09K 8/60* | (2006.01) | |
| *A01N 47/44* | (2006.01) | |
| *C09K 8/035* | (2006.01) | |
| *A01N 33/12* | (2006.01) | |

(52) U.S. Cl.
CPC ............. *C09K 8/605* (2013.01); *A01N 47/44* (2013.01); *C09K 8/035* (2013.01); *A01N 33/12* (2013.01)

(58) Field of Classification Search
None
See application file for complete search history.

(56) References Cited

U.S. PATENT DOCUMENTS

| | | | |
|---|---|---|---|
| 5,508,250 A | 4/1996 | Miller et al. | |
| 5,779,914 A | 7/1998 | Brown et al. | |
| 6,149,927 A | 11/2000 | Ghosh | |
| 6,180,056 B1 | 1/2001 | McNeel et al. | |
| 6,267,979 B1 | 7/2001 | Raad et al. | |
| 2001/0016589 A1 | 8/2001 | Modak et al. | |
| 2002/0028754 A1 | 3/2002 | Johansen | |
| 2003/0189013 A1 | 10/2003 | Unhoch | |
| 2004/0120853 A1* | 6/2004 | Carpenter | A01N 59/00 422/37 |
| 2004/0129644 A1 | 7/2004 | Unhoch | |
| 2005/0036982 A1 | 2/2005 | Unhoch | |
| 2006/0283811 A1 | 12/2006 | Unhoch | |
| 2012/0285693 A1 | 11/2012 | Mirakyan et al. | |
| 2012/0289436 A1* | 11/2012 | Woodward | C07F 9/5407 507/111 |
| 2014/0087978 A1* | 3/2014 | Deville | C01B 15/01 507/240 |
| 2014/0221318 A1 | 8/2014 | Yin | |
| 2014/0374103 A1 | 12/2014 | Seth et al. | |
| 2015/0038471 A1* | 2/2015 | Lee | C02F 1/50 514/129 |
| 2015/0045223 A1 | 2/2015 | Shaw | |
| 2016/0280988 A1 | 9/2016 | Underwood et al. | |
| 2017/0208799 A1 | 7/2017 | Sianawati et al. | |

FOREIGN PATENT DOCUMENTS

| | | |
|---|---|---|
| CA | 2177160 A1 | 6/1995 |
| CN | 101573145 A | 11/2009 |
| CN | 101884337 A | 11/2010 |
| EP | 0997068 A1 | 5/2000 |
| JP | H1045514 A | 2/1998 |
| JP | 2001240507 A | 9/2001 |
| WO | 9614092 A1 | 5/1996 |
| WO | 9734834 A1 | 9/1997 |
| WO | 0193684 A2 | 12/2001 |
| WO | 2012154785 A2 | 11/2012 |
| WO | 2012173715 A2 | 12/2012 |

OTHER PUBLICATIONS

Llorens et al., "Polybiguanide (PHMB) loaded in PLA scaffolds displaying high hydrophobic, biocompatibility and antibacterial properties", Materials Science and Engineering: C, vol. 50, pp. 74-84, 2015.
Mashat, "Polyhexamethylene Biguanide Hydrchloride: Features and Applications", British Journal of Environmental Sciences, vol. 4, pp. 49-55, 2016.
Matthews et al., "Nature and extent of the interactions of humic acids with a water treatment algicide and a fungicide", Chemosphere, vol. 30, pp. 1565-1572, 1995.
International Search Report and Written Opinion for PCT/US2018/054080, dated Dec. 19, 2018, 9 pages.

* cited by examiner

*Primary Examiner* — John J Figueroa
(74) *Attorney, Agent, or Firm* — McNees Wallace & Nurick LLC

(57) ABSTRACT

A biocidal additive includes a blend of a biguanide compound and a polymeric ammonium compound. A method of treating a water system includes adding a biocidal additive to the water system to achieve a minimum inhibitory concentration or greater in the water system. In exemplary embodiments, the water system is a well treatment fluid for oil and gas applications, the blend is a synergistic blend, the biguanide compound is polyhexamethylene biguanide, and the polymeric ammonium compound is poly[oxyethylene (dimethyliminio)ethylene(dimethyliminio)ethylene dichloride].

17 Claims, No Drawings

TREATMENT OF CIRCULATING WATER SYSTEMS INCLUDING WELL TREATMENT FLUIDS FOR OIL AND GAS APPLICATIONS

CROSS-REFERENCE TO RELATED APPLICATIONS

This application claims priority to and the benefit of U.S. Provisional Application No. 62/567,320 filed Oct. 3, 2017, which is hereby incorporated by reference herein in its entirety.

FIELD OF THE INVENTION

The present embodiments are directed to water treatment. More specifically, the present embodiments are directed to biocidal additives and methods of treating aqueous systems with biocidal additives to inhibit growth of micro-organisms.

BACKGROUND OF THE INVENTION

The presence and growth of micro-organisms in aqueous systems, especially in industrial water systems, is a concern. Examples of industrial water systems where micro-organisms are a concern include, but are not limited to, cooling water systems, pulping and papermaking systems, and oil and gas field water systems.

A known method of controlling microbial growth in aqueous systems is the use of biocides. While biocides are known to inhibit microbial growth, the biocidal effect is generally of limited duration. The effectiveness of known biocides may be rapidly reduced as a result of exposure to negative influences. Negative influences may include, but are not limited to, certain temperature or pH conditions or reaction with ingredients present in the system that neutralizes their biocidal effect. Therefore, the use of such biocides may involve continuous or frequent replenishment at multiple sites or zones in the system being treated. The materials costs of the biocide treatment and the labor costs associated with the application of known biocides may therefore be significant.

Known biocides can be highly toxic in the quantities known to be required for effective control of microbial populations in certain applications. As a result, the amount of biocides that may be safely discharged into the environment may be limited by environmental regulations. Therefore, the need exists for improved methods for controlling microbial growth in aqueous systems.

As noted above, known biocides have a number of limitations including the large quantities of biocides typically required to achieve the desired biocidal effect and the potential harmful effects on the environment of biocides, and therefore reducing the amount necessary for control and thus the quantity released to the environment has many benefits.

The presence of micro-organisms in industrial water systems may result in the formation of deposits on system surfaces. These deposits or slimes may give rise to various problems. In cooling water systems, slime may restrict water flow, reduce heat transfer efficiency, cause corrosion, and be aesthetically unappealing, especially if algae are present, due to their visible green pigmentation. Corrosion may also occur in industrial water systems, even in the absence of visible slime, through the action of micro-organisms.

*Pseudomonas aeruginosa* are bacteria commonly present in air, water, and soil. These bacteria continually contaminate open cooling water systems, pulping and papermaking systems, and oil and gas field water systems and are among the most common slime formers. Slime may be viewed as a mass of cells stuck together by the cementing action of the gelatinous secretions around each cell. The slime entraps other debris, restricts water flow and heat transfer, and may serve as a site for corrosion.

*Chlorella vulgaris* are algae commonly present in air, water, and soil. These algae continually contaminate open cooling water systems and their growth turns the water and surfaces in these systems green. These algae also provide a food source for bacteria, which may stimulate slime formation and growth of protozoa, which may harbor the pathogenic bacterium *Legionella pneumophila*.

In pulp and paper mill systems, slime formed by micro-organisms may cause fouling, plugging, or corrosion of the system. The slime may also break loose and become entrained in the produced paper, causing blemishes, holes, tears, and odor in the finished product. The end result may therefore be unusable product and wasted output.

Slime may also be a problem in oil and gas field water systems and may cause energy losses due to increased fluid frictional resistance, formation plugging, and corrosion. The slime may harbor a mixture of aerobic and anaerobic bacteria that are responsible for the production of hydrogen sulfide gas. The hydrogen sulfide may cause souring of oil and gas, which may reduce the quality of these products and increase treatment costs.

In order to extract oil and gas from geological formations, well treatment fluids are pumped into wells. One known process of extraction is hydraulic fracturing, also known as fracking or hydrofracking. In the fracking process, a well treatment fluid is pumped through a well bore hole into a geological formation at a high pressure to cause the creation and opening up of fractures in the geological formation.

Known additives for well treatment fluids include a blend of glutaraldehyde and a quaternary ammonium compound. Such blends are often insufficient in that the quaternary ammonium compound may not provide sufficient preservative activity. Further additives may include an oxidizing biocide and a non-oxidizing biocide separately, and a fast-acting non-oxidizing biocide and a preservative biocide may be applied to the well treatment fluid. Known oxidizing biocides include, but are not limited to, bleach, chlorine dioxide ($ClO_2$), and stabilized chlorine. The application of separate biocide additive compositions may be cumbersome and expensive.

Accordingly, the present disclosure aims to address at least one disadvantage associated with the prior art, whether discussed herein or otherwise.

BRIEF DESCRIPTION OF THE INVENTION

In an embodiment, a method treats a well treatment fluid for oil and gas applications. The method includes adding a biocidal additive to the well treatment fluid to achieve a minimum inhibitory concentration or greater in the well treatment fluid. The biocidal additive is a blend of a biguanide compound and a polymeric ammonium compound.

In another embodiment, a biocidal additive includes a blend of a biguanide compound and a polymeric ammonium compound.

In another embodiment, a method of treating a water system includes adding a biocidal additive to the water system to achieve a minimum inhibitory concentration or greater in the water system. The biocidal additive is a blend of a biguanide compound and a polymeric ammonium compound.

Other features and advantages of the present invention will be apparent from the following more detailed description, which illustrates, by way of example, the principles of the invention.

DETAILED DESCRIPTION OF THE INVENTION

Provided are biocidal additives and methods of treating water systems with biocidal additives. Exemplary embodiments are particularly effective at treating water systems used in oil and gas applications, providing both initial top side effectiveness as well as persistent effectiveness in downwell environments.

As used herein, "oil and gas applications" refers to any applications using a well treatment fluid to extract oil and/or gas from a subterranean geological formation, such as, for example, in hydraulic fracturing. In exemplary embodiments, the biocidal additive in the well treatment fluid provides treatment of both topside and downhole bacterial presence.

Embodiments of the present disclosure, for example, in comparison to concepts failing to include one or more of the features disclosed herein, solve a need for two or more separate biocides, provide quick treatment of topside initial bacterial presence, provide persistent treatment of downhole bacterial presence, provide both quick treatment of topside initial bacterial presence and persistent treatment of downhole bacterial presence, kill anaerobic sulfate-reducing bacteria (SRB) and acid-producing bacteria (APB), synergistically control bacterial growth, or combinations thereof.

A biocidal additive includes a blend of a biguanide compound and a polymeric ammonium compound. In some embodiments, the biguanide compound and the polymeric ammonium compound are the only biocidally active ingredients in the biocidal additive, and the biocidal additive contains no other active biocidal ingredients or no other active ingredients. In some embodiments, the blend is a synergistic blend. The synergistic blend surprisingly and unexpectedly provides a biocidal effect that is greater than the sum of the biocidal effects of the biguanide compound and the polymeric ammonium compound individually.

Appropriate biguanide compounds may include, but are not limited to, polyhexamethylene biguanide (PHMB), also known as polyhexanide (formula 1, below), 1,6-bis-(4-chlorophenylbiguanido)hexane ($C_{22}H_{30}C_{12}N_{10}$), also known as chlorhexidine (formula 2, below), and 2-ethylhexyl bisbiguanide ($C_{26}H_{56}N_{10}$), also known as alexidine (formula 3, below). In some embodiments, the biguanide compound is PHMB.

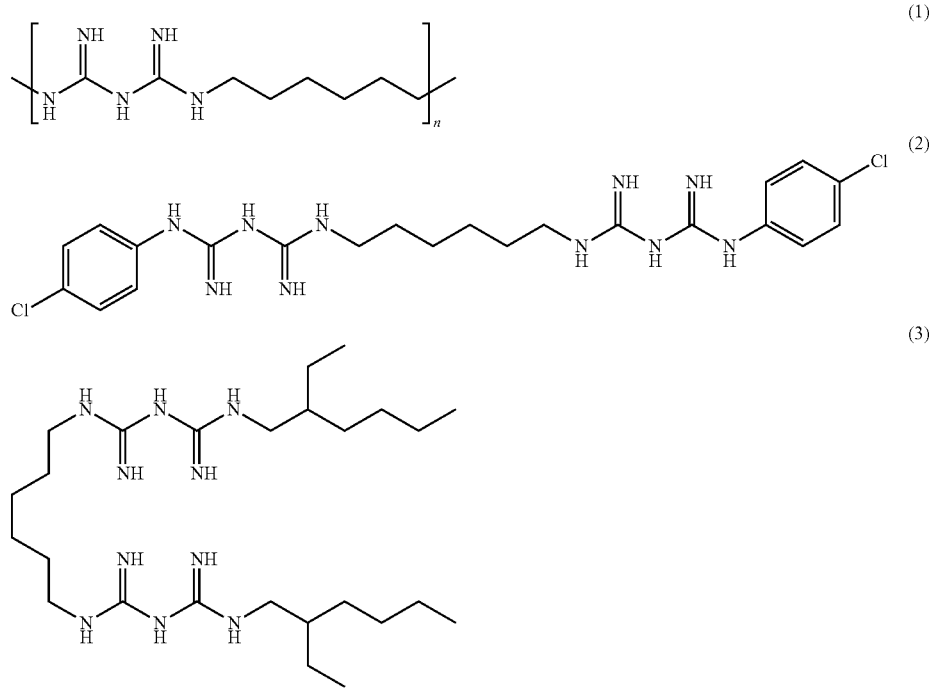

In some embodiments, the polymeric ammonium compound is a polymeric quaternary ammonium compound. Polymeric quaternary ammonium compounds are conventionally not used in oil and gas applications. Although polymeric quaternary ammonium compounds are good at killing aerobic bacteria and algae, they are not very effective alone at killing the anaerobic bacteria found in oil and gas applications.

In some embodiments, the polymeric quaternary ammonium compound is a water-soluble cationic polymer (WSCP). In some embodiments, the polymeric quaternary ammonium compound is an ionene. Appropriate polymeric ammonium compounds may include, but are not limited to, poly[oxyethylene(dimethyliminio)ethylene(dimethyliminio)ethylene dichloride] (PQ), also known as polixetonium chloride (formula 4, below), polidronium chloride, also known as polyquaternium 1 (formula 5, below), and poly[bis(2-chloroethyl) ether-alt-1,3-bis[3-(dimethylamino)propyl]urea], also known as polyquaternium 2 (formula 6, below). In some embodiments, the polymeric quaternary ammonium compound is PQ.

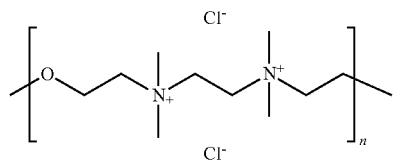

(4)

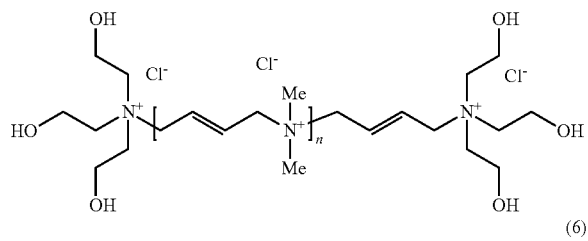

(5)

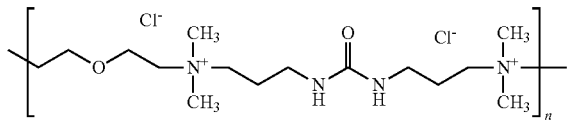

(6)

In some embodiments, the biological additive controls both the quick topside initial bacterial presence and the persistent downhole bacterial presence, where bacteria may be reintroduced to the water system.

In some embodiments, the biocidal additive synergistically controls growth of both anaerobic SRB, such as, for example *Desulfovibrio vulgaris*, and APB, such as, for example, *Enterobacter aerogenes*, in a water system. Thus, a single composition works synergistically to provide control of the growth of SRB and APB.

In some embodiments, the biocidal additive is a blend of the biguanide compound and the polymeric ammonium compound in a molar ratio of about 5:1 to about 1:10, alternatively about 2:1 to about 1:3, alternatively about 1:1 to about 1:3, alternatively about 2:1 to about 1:1, alternatively about 1:1 to about 1:2, alternatively about 1:2 to 1:3, alternatively about 2:1, alternatively about 1:1, alternatively about 1:2, alternatively about 1:3, or any ratio, range, or sub-range therebetween.

In some embodiments, the weight average molecular weight of the biguanide compound is in the range of about 500 g/mol to about 6000 g/mol.

In some embodiments, the weight average molecular weight of the polymeric ammonium compound is in the range of about 2000 g/mol to about 3000 g/mol.

In some embodiments, the biocidal additive is an aqueous solution. In some embodiments, the blend is present in a total concentration by weight in water of about 2% to about 5%, alternatively about 2.4% to about 4%, alternatively about 2.4% to about 3%, alternatively about 3% to about 3.5%, alternatively about 3.5% to about 4%, or any value, range, or sub-range therebetween.

A method of treating a water system includes adding a biocidal additive to the water system to achieve a minimum inhibitory concentration or greater in the water system, where the biocidal additive includes a blend of biguanide compound and a polymeric ammonium compound. In some embodiments, the blend includes only the biguanide compound and the polymeric ammonium compound and the biocidal additive includes no other biocidally-active components. In some embodiments, the water system is a well treatment fluid for an oil and/or gas application. In some embodiments, the method includes adding the biocidal additive to the water system to achieve a protective concentration of the blend in the water system in the range of about 1 ppm to about 10 ppm, alternatively about 1 ppm to about 5 ppm, alternatively about 5 ppm to about 10 ppm, alternatively about 2 ppm to about 8 ppm, or any value, range, or sub-range therebetween.

EXAMPLES

The invention is further described in the context of the following examples which are presented by way of illustration, not of limitation.

A first biocidal additive of a synergistic blend of a biguanide compound and a polymeric ammonium compound was prepared. The biguanide compound was PHMB having a weight average molecular weight in the range of 500 g/mol to about 6000 g/mol. The polymeric ammonium compound was PQ having a weight average molecular weight in the range of about 2000 g/mol to about 3000 g/mol. The biguanide compound and the polymeric ammonium compound were blended at a molar ratio of about 1:2 in water. The concentration of the biguanide compound was about 2.4% by weight of the first biocidal additive, and the concentration of the polymeric ammonium compound was about 4% by weight of the first biocidal additive.

The first biocidal additive was effective for biofilm removal, effective at an alkaline pH, and stable at a high temperature. The first biocidal additive was compatible with friction reducers, hydrogen sulfide, oxygen scavengers, and ammonia at the concentrations typically found in well treatment fluids.

In a first experiment, four samples were tested for bacterial concentrations to show the efficacy of the first biocidal additive on SRB and APB. The results are summarized in Table 1. The SRB was *Desulfovibrio vulgaris* and the APB was *Enterobacter aerogenes* for this experiment. A first control sample contained SRB in a buffer without the first biocidal additive. A first inventive sample contained SRB in a buffer with the first biocidal additive in an amount of about 250 ppm. The concentration of the synergistic blend in the first inventive sample was about 16 ppm. A second control sample contained APB in a buffer without the first biocidal additive. A second inventive sample contained APB in a buffer with the first biocidal additive in an amount of about 250 ppm. The concentration of the synergistic blend in the second inventive sample was about 16 ppm. The starting concentration of the SRB was $1 \times 10^6$ colony-forming units per milliliter (CFU/mL). The starting concentration of the APB was $1 \times 10^7$ CFU/mL. The buffer had a pH of 8 with 30,000 ppm total dissolved solids.

TABLE 1

Quick and Persistent Efficacy of Water System Treatments

| | SRB | | APB | |
| | Control | First Biocidal Additive | Control | First Biocidal Additive |
| --- | --- | --- | --- | --- |
| 1 hour | $10^6$ | N/D | $10^7$ | N/D |
| 7 days | $10^6$ | N/D | $10^7$ | N/D |
| 14 days | $10^7$ | N/D | $10^8$ | N/D |

The bacterial concentration of each sample was tested at 1 hour, 7 days, and 14 days after the start of the test. The SRB concentration in the first control sample was about 1×10$^6$ CFU/mL, 1×10$^6$ CFU/mL, and 1×10$^7$ CFU/mL at 1 hour, 7 days, and 14 days, respectively. No SRB was detectable (N/D) in the first inventive sample at 1 hour, 7 days, and 14 days. The APB concentration in the second control sample was about 1×10$^7$ CFU/mL, 1×10$^7$ CFU/mL, and 1×10$^8$ CFU/mL at 1 hour, 7 days, and 14 days, respectively. No APB was detectable (N/D) in the second inventive sample at 1 hour, 7 days, and 14 days.

The 1-hour test illustrates the quick efficacy of the first biocidal additive to control a topside initial bacterial presence, and the 7-day and 14-day tests illustrate the persistent efficacy of the first biocidal additive to control a downhole bacterial presence.

In a second experiment, a minimum inhibitory concentration (MIC) was determined for the biguanide compound alone, the polymeric ammonium compound alone, and the first biocidal additive for a first sample containing SRB and a second sample containing APB. Again, the SRB was *Desulfovibrio vulgaris* and the APB was *Enterobacter aerogenes*. As in the first experiment, the starting concentration of the SRB was 1×10$^6$ colony-forming units per milliliter (CFU/mL), the starting concentration of the APB was 1×10$^7$ CFU/mL, and the buffer had a pH of 8 with 30,000 ppm total dissolved solids. Again, the first biocidal additive included the biguanide compound and the polymeric ammonium compound blended at a molar ratio of about 1:2 in water.

Each biocide was added to test samples at a range of differing concentrations and each test sample was tested after one hour for microbial growth using serial dilution in SRB-specific media for detection of the SRB sample and APB-specific media for detection of the APB sample. The MIC was determined as the lowest biocide concentration sample showing no detectable growth from the serial dilutions. The results are summarized in Table 2.

TABLE 2

Minimum Inhibitory Concentration of Water System Treatments

| | SRB | | APB | |
|---|---|---|---|---|
| | Alone | First Biocidal Additive | Alone | First Biocidal Additive |
| PHMB | 2 ppm | 1 ppm | 6 ppm | 4.5 ppm |
| PQ | 1000+ ppm | | 1000+ ppm | |

The MIC was determined as the lowest concentration of the biocide that prevented growth for a 1-hour exposure. The MIC for the PHMB alone with SRB was 2 ppm, and the MIC for the poly[oxyethylene(dimethyliminio)ethylene(dimethyliminio)ethylene dichloride] alone with SRB was greater than 1000 ppm. The MIC for the first biocidal additive with SRB was 1 ppm, showing a synergistic effect on the control of SRB growth. The MIC for the PHMB alone with APB was 6 ppm, and the MIC for the poly[oxyethylene(dimethyliminio)ethylene (dimethyliminio)ethylene dichloride] with APB was greater than 1000 ppm. The MIC for the first biocidal additive with APB was 4.5 ppm, showing a synergistic effect on the control of APB growth.

A second biocidal additive of a synergistic blend of a biguanide compound and a polymeric ammonium compound was prepared. The biguanide compound was PHMB having a weight average molecular weight in the range of 500 g/mol to about 6000 g/mol. The polymeric ammonium compound was PQ having a weight average molecular weight in the range of about 2000 g/mol to about 3000 g/mol. The biguanide compound and the polymeric ammonium compound were blended at a molar ratio of about 1:1 in water.

The second biocidal additive was effective for biofilm removal, effective at an alkaline pH, and stable at a high temperature. The second biocidal additive was compatible with friction reducers, hydrogen sulfide, oxygen scavengers, and ammonia at the concentrations typically found in well treatment fluids.

In a third experiment, a minimum inhibitory concentration (MIC) was determined for the biguanide compound alone, the polymeric ammonium compound alone, and the second biocidal additive for a first sample containing SRB and a second sample containing APB. Again, the SRB was *Desulfovibrio vulgaris* and the APB was *Enterobacter aerogenes*. As in the first and second experiments, the starting concentration of the SRB was 1×10$^6$ colony-forming units per milliliter (CFU/mL), the starting concentration of the APB was 1×10$^7$ CFU/mL, and the buffer had a pH of 8 with 30,000 ppm total dissolved solids. Again, the second biocidal additive included the biguanide compound and the polymeric ammonium compound blended at a molar ratio of about 1:1 in water.

Each biocide was added to test samples at a range of differing concentrations and each test sample was tested after one hour for microbial growth using serial dilution in SRB-specific media for detection of the SRB sample and APB-specific media for detection of the APB sample. The MIC was determined as the lowest biocide concentration sample showing no detectable growth from the serial dilutions. The results are summarized in Table 3.

TABLE 3

Minimum Inhibitory Concentration of Water System Treatments

| | SRB | | APB | |
|---|---|---|---|---|
| | Alone | Second Biocidal Additive | Alone | Second Biocidal Additive |
| PHMB | 2 ppm | 0.7 ppm | 6 ppm | 4 ppm |
| PQ | 1000+ ppm | | 1000+ ppm | |

The MIC was determined as the lowest concentration of the biocide that prevented growth for a 1-hour exposure. The MIC for the PHMB alone with SRB was 2 ppm, and the MIC for the poly[oxyethylene(dimethyliminio)ethylene(dimethyliminio)ethylene dichloride] alone with SRB was greater than 1000 ppm, as previously discussed above with respect to the first biocidal additive. The MIC for the second biocidal additive with SRB was 0.7 ppm, showing a synergistic effect on the control of SRB growth. The MIC for the PHMB alone with APB was 6 ppm, and the MIC for the poly[oxyethylene(dimethyliminio)ethylene (dimethyliminio)ethylene dichloride] with APB was greater than 1000 ppm, as previously discussed above with respect to the first biocidal additive. The MIC for the second biocidal additive with APB was 4 ppm, showing a synergistic effect on the control of APB growth.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of treating a well treatment fluid for oil and gas applications, the method comprising adding a biocidal additive to the well treatment fluid to achieve a minimum inhibitory concentration or greater in the well treatment fluid, wherein the biocidal additive is a blend of a biguanide compound and a polymeric ammonium compound, wherein the polymeric ammonium compound is poly[oxyethylene (dimethyliminio)ethylene(dimethyliminio)ethylene dichloridel].

2. The method of claim 1, wherein the biocidal additive provides treatment of topside initial bacterial presence and treatment of downhole bacterial presence.

3. The method of claim 1, wherein the blend is a synergistic blend.

4. The method of claim 1, wherein the biguanide compound is polyhexamethylene biguanide.

5. The method of claim 1 further comprising mixing the biguanide compound and the polymeric ammonium compound to form the blend.

6. The method of claim 1, wherein the biguanide compound and the polymeric ammonium compound are at a molar ratio in the range of about 1:1 to about 1:2 in the blend.

7. The method of claim 1, wherein the biocidal additive further comprises water, the biocidal additive comprising the blend in water at a concentration in a range of about 2.4% to about 4% by weight.

8. The method of claim 1, wherein the adding the biocidal additive to the well treatment fluid at the minimum inhibitory concentration or greater comprises adding the biocidal additive to the well treatment fluid to achieve a protective concentration of the blend in the range of about 1 ppm to about 5 ppm in the well treatment fluid.

9. The method of claim 1, wherein the biocidal additive provides control of growth of both anaerobic sulfate-reducing bacteria and acid-producing bacteria in the well treatment fluid.

10. A biocidal additive comprising a blend of a biguanide compound and a polymeric ammonium compound, wherein the polymeric ammonium compound is poly[oxyethylene (dimethyliminio)ethylene(dimethyliminio)ethylene dichloridel].

11. The biocidal additive of claim 10, wherein the blend is a synergistic blend.

12. The biocidal additive of claim 10, wherein the biguanide compound is polyhexamethylene biguanide.

13. The biocidal additive of claim 10, wherein the biguanide compound and the polymeric ammonium compound are at a molar ratio in the range of about 1:1 to about 1:2 in the blend.

14. The biocidal additive of claim 10 further comprising water, wherein the biocidal additive comprises the blend in water at a concentration in a range of about 2.4% to about 4% by weight.

15. A method of treating a water system comprising adding a biocidal additive to the water system to achieve a minimum inhibitory concentration or greater in the water system, wherein the biocidal additive is a blend of a biguanide compound and a polymeric ammonium compound, wherein the polymeric ammonium compound is poly[oxyethylene(dimethyliminio)ethylene(dimethyliminio)ethylene dichloridel].

16. The method of claim 15, wherein the biguanide compound is polyhexamethylene biguanide.

17. The method of claim 15, wherein the adding the biocidal additive to the water system at the minimum inhibitory concentration or greater comprises adding the biocidal additive to the water system to achieve a protective concentration of the blend in the range of about 1 ppm to about 5 ppm in the water system.

* * * * *